W. SCHOELER.
SAFETY DEVICE FOR GAS VALVES.
APPLICATION FILED APR. 8, 1912.
1,070,187.
Patented Aug. 12, 1913.
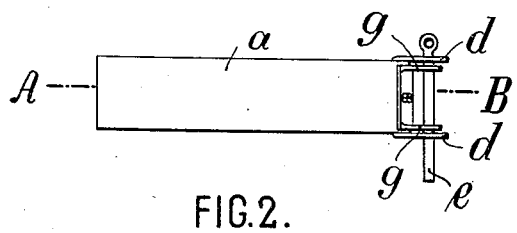
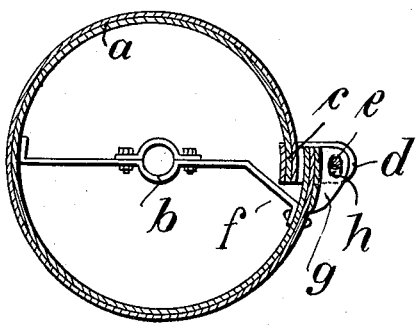
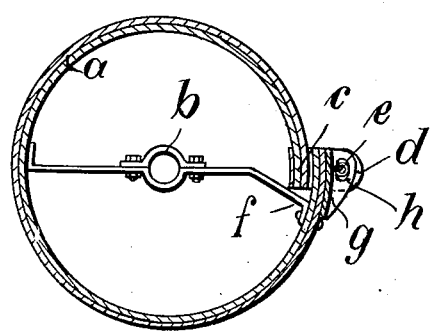
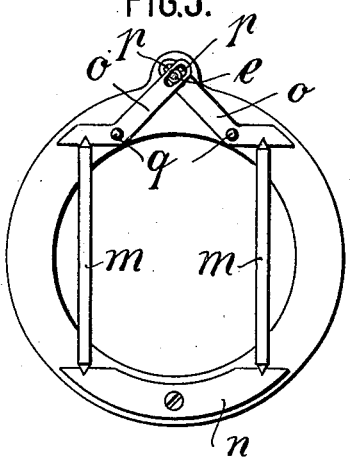
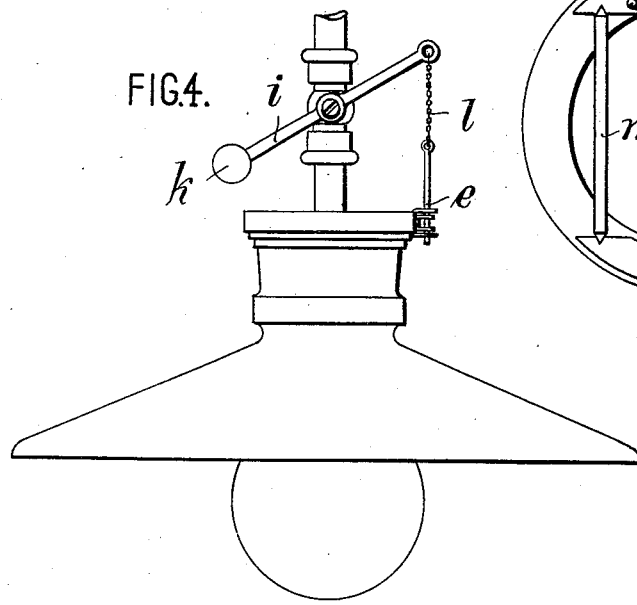
Witnesses:
Inventor:

UNITED STATES PATENT OFFICE.

WALTER SCHOELER, OF BRESLAU, GERMANY.

SAFETY DEVICE FOR GAS-VALVES.

1,070,187.  Specification of Letters Patent.  Patented Aug. 12, 1913.

Application filed April 8, 1912. Serial No. 689,396.

*To all whom it may concern:*

Be it known that I, WALTER SCHOELER, a subject of the King of Prussia, German Emperor, residing at Breslau, in the Kingdom of Prussia, Germany, have invented certain new and useful Improvements in Safety Devices for Gas-Valves, of which the following is a specification.

This invention relates to a safety device for gas valves which serves for locking the valve in the open position when the burner is lighted, the locking being effected by means of a clamping device acted upon by an intermediary body of a material which expands when it is heated and a pin connected with the lever of the valve stem and guided in the clamping pieces. These clamping pieces are displaced by the expansible body in such a manner that they clamp in the pin when said intermediary body expands by the heat of the burner. The clamping device can be separated from the gas valve by any distance and the pin can be clamped in at any point of its length so that the action of the safety device is completely independent of the construction of the lamp. With small burners or with small gas valves a ring-shaped or spiral-shaped metal band having at its ends guides for the pin is used for clamping in the pin. If this metal band expands the ends in which the pin is guided have the tendency to move away the one from the other whereby the pin is locked in its position. This arrangement has the advantage that, even if the metal band is heated very strongly, it will not deform. When a stronger clamping in of the pin is necessary a convenient lever system can be combined with the expansible body which in this case may consist of rigid rods or of wires, said lever system serving for clamping in the locking pin.

In the accompanying drawings the invention is shown in two forms of construction.

Figure 1 shows one form of construction in side elevation. Fig. 2 is a section of line A—B of Fig. 1, the expansible body being shown at its normal state. Fig. 3 is a similar view as Fig. 2 showing the expansible body expanded. Fig. 4 shows the device mounted upon a gas lamp. Fig. 5 shows the second form of construction.

According to Figs. 1 to 4 the expansible body consists of a metal band $a$ which is made of two different metals and soldered together and which has the form of a ring. This metal ring $a$ can however, be spiral-shaped if required. This metal ring $a$ is mounted above the gas lamp by means of a suitable support $b$ so that it is exposed to the action of the hot gases coming from the lamp, as can be seen from Fig. 4. One end $c$ of the metal ring $a$ has lugs $d$ in which a pin $e$ is guided, the other end $f$ having clamping jaws $g$, $g$ with guide slots $h$, $h$ for the pin $e$.

The lever $i$ of the gas valve has at one end the usual counterweight $k$ which serves for maintaining the gas valve in the closing position. The other end of this lever $i$ is connected with the pin $e$ by a chain $l$ or any other convenient device.

This device operates as follows: Before the lamp is lighted, that is to say, as long as the metal ring $a$ is not heated, its ends are in the position shown in Fig. 2 of the drawing. The pin $e$ is loosely guided in the slots $h$ of the clamping jaws $g$ and it can freely slide in the lugs $d$ when the gas valve is being opened. When the burner is lighted the metal ring $a$ expands immediately through the heat and adopts the position shown in Fig. 3. The ends of the slots $h$ are thus strongly pressed against the pin $e$ locking the same by friction in the lugs $d$. The friction is sufficiently strong to compensate the action of the counterweight $k$ so that the gas valve is maintained in the open position by the pin $e$ being clamped in. In order to close the gas valve an additional pressure has to be exerted upon the counterweight so as to overcome the friction of the pin $e$. As soon as the flame has been extinguished the metal ring $a$ contracts to its normal position whereby the pin $e$ is released. If it has been overlooked to shut off the gas from the lamp and if the flame is extinguished by the closing of the valve of the main conduit the metal ring $a$ will contract as soon as it gets cool whereby the pin $e$ is released so that the gas valve is automatically closed through the action of the counterweight $k$.

According to Fig. 5 the expansible body consists of two pins $m$, $m$ which are mounted with one end in an arc shaped support $n$. The position of this support piece $n$ can be regulated by a regulating screw, which is not shown in the drawings. The other ends of the pins $m$ bear against levers $o$, $o$ which are pivotally mounted upon the axles $q$, $q$ and which have guide slots $p$, $p$ at their other ends, the pin $e$ being guided in said slots. It is evident that when the pins $m$, $m$ get hot after the lamp has been lighted they expand and exert a pressure upon the inner ends of the levers $o$, $o$ whereby said levers, swinging around their axles $q$, $q$ clamp in the guide pin $e$. As soon as the flame is extinguished the pins $m$, $m$ get cool, contract, and pull the levers $o$, back to the normal position. If the ends of the pins $m$, $m$ are not fixed to the levers $o$, $o$ but merely bear against the same, a spring has to be provided for returning the levers to the normal position.

I claim:—

1. A safety device for gas valves comprising in combination with the counterweighted lever of the gas valve a body of a material which expands if heated, lugs extending from said expansible body and having guide slots, a vertical pin guided in said slots and means for connecting said pin with the end of the counterweighted lever of the gas valve, substantially as described and shown and for the purpose set forth.

2. A safety device for gas valves comprising in combination with the counterweighted lever of the valve, a ring shaped metal band mounted above the lamp so that it is exposed to the heated gases said ring being made of two different metals soldered together, laterally projecting lugs at one end of said ring having holes, laterally extending clamping jaws at the other end of said metal ring having guide slots, a vertical pin guided in said holes of the lugs and in said slots of the clamping jaws, and a chain for connecting said pin with the free end of said counterweighted lever, substantially as described and shown and for the purpose set forth.

3. A safety device for gas valves comprising in combination with the counterweighted lever of the gas valve, an arc shaped support adjustably mounted above the burner, two levers having each a longitudinal slot at the outer end pivotally mounted at the other side of the burner opposite said support, two rods of expansible material bearing with one end upon said support and fixed with the other end to the inner ends of said levers, and a vertical pin guided in the slots of said levers and connected with the free end of said counterweighted lever, substantially as described and shown and for the purpose set forth.

In witness whereof I have hereunto set my hand in the presence of two witnesses.

WALTER SCHOELER.

Witnesses:
 BRUNO DOWLING,
 LUM G. KATZ.

---

Copies of this patent may be obtained for five cents each, by addressing the "Commissioner of Patents, Washington, D. C."